United States Patent [19]
Gill et al.

[11] 3,789,726
[45] Feb. 5, 1974

[54] LOAD-INDICATING MEANS FOR A NUT AND BOLT ASSEMBLY

[75] Inventors: Peter John Gill, Wolverhampton; Dennis Joseph O'Donnell, Walsall, both of England

[73] Assignee: GKN Screws & Fasteners Limited, Smethwick, Warley, England

[22] Filed: May 22, 1972

[21] Appl. No.: 255,679

[52] U.S. Cl. .................................................. 85/62
[51] Int. Cl. .......................................... F16b 31/02
[58] Field of Search ........... 85/61, 62; 151/38, 21 C

[56] References Cited
UNITED STATES PATENTS

| | | | |
|---|---|---|---|
| 1,838,605 | 12/1931 | Youlten | 151/21 C |
| 3,194,105 | 7/1965 | Gill | 85/62 |
| 3,383,974 | 5/1968 | Dahl | 85/62 |
| 3,474,701 | 10/1969 | Setzler | 85/62 |

FOREIGN PATENTS OR APPLICATIONS

| | | | |
|---|---|---|---|
| 870,946 | 6/1961 | Great Britain | 85/62 |
| 188,224 | 11/1966 | U.S.S.R. | 151/38 |

Primary Examiner—Marion Parsons, Jr.
Attorney, Agent, or Firm—Merriam, Marshall, Shapiro & Klose

[57] ABSTRACT

A load-indicating nut in which the nut body has at one end a radially extending flange and wherein the cross section of the flange taken in a radial plane is such that there is provided an internal surface to the annular flange which takes the form of an annular groove of generally V-section with the apex thereof directed radially outwardly and the one leg of this V-section which is joined to the body being constructed and arranged so that when the axial tensile load in the bolt shank reaches or exceeds a predetermined minimum value, plastic deformation of the metal of the flange takes place in shear in this one leg and the body moves in a direction towards the abutment against which it is being tightened so that there occurs a measurable reduction in the overall axial dimension of the nut.

5 Claims, 4 Drawing Figures

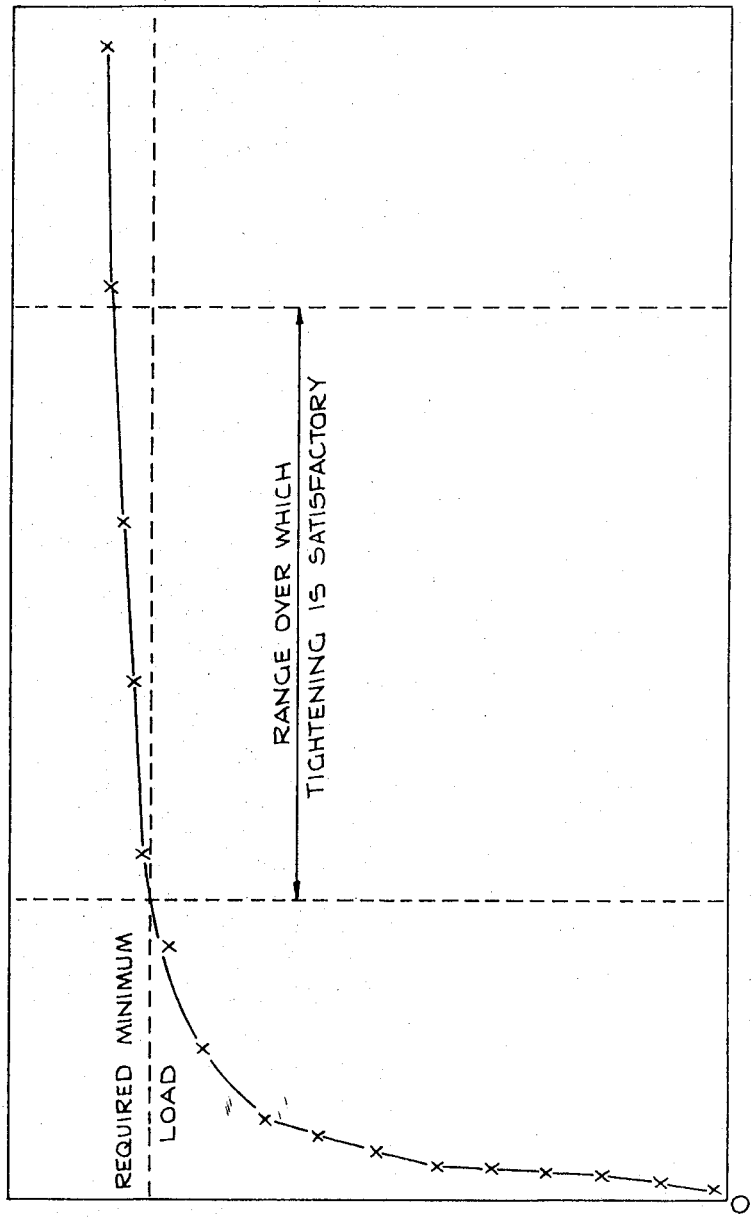

LOAD-INDICATING MEANS FOR A NUT AND BOLT ASSEMBLY

BACKGROUND OF THE INVENTION

1. Field of the Invention

It is well known and accepted that to achieve maximum efficiency in a nut and bolt fastening it is necessary to tighten the nut and bolt assembly to such an extent that the tension generated in the bolt shank reaches, and preferably exceeds, a certain predetermined minimum. This is particularly important in certain applications such as high strength bolted connections and also in nut and bolt fastenings used in aircraft where it is very essential to ensure that nut and bolt assemblies are correctly tightened and that there shall be no slackening of the connection under working conditions where the nut and bolt assembly is subjected to vibrations and other fluctuating stresses.

The present invention relates to means which will provide a detectable indication (e.g., visual and/or measurable so that it can be known that the nut and bolt assembly has been correctly tightened to such an extent as to ensure that the desired minimum tension in the bolt shank has been reached or exceeded.

The indicating means to which the present invention relates may be incorporated in the body of the nut or the head of the bolt. Hereinafter the expression "body" (except where otherwise qualified, such as by reference to the accompanying drawings) refers to the body of a nut or the head of a bolt. The invention is concerned with indicating means wherein the body is formed in such a manner that, when used in a nut and bolt assembly which is tightened, a portion or portions of the body is plastically deformed when the tension in the shank of the bolt reaches or exceeds a predetermined minimum value, the deformation being such as to give a detectable indication (e.g., visual and/or measurable) in such a way that it can be known that the desired minimum tension in the bolt shank has been reached or exceeded.

2. Description of the Prior Art

A prior proposal in this field for a load-indicating nut and load-indicating bolt has used the device of detecting and measuring the change in dimension of a gap which exists initially between a portion or portions of the body and an abutment against which the body is tightened, the change in dimension of such gap taking place when the desired minimum tension is reached in the bolt shank and the formation of the body around the gap being such that when this desired minimum tension is reached portions of the body adjacent the gap undergo plastic deformation and the body moves axially to reduce the dimensions of the gap. In such prior proposal gaps were provided on the underside of a nut body or on the underside of the head of a bolt.

In one particular version of such prior proposal a nut suitable for application in aircraft nut and bolt fastenings has a base flange of a generally triangular configuration providing three bearing pads to engage an abutment at three apices and along the three sides of the flange there were provided recesses in the underside of the flange which, when the flange was in engagement with an abutment in the assembly, defined gaps between the flange and the abutment and such gaps were used to give the measurable indication referred to above.

Certain drawbacks exist with the load-indicating nut disclosed in the aforesaid specification, one of which is due to the fact that the presence of the recesses in the three sides of the flange means that there is not a continuous surface-bearing area of flange to engage the abutment and aircraft manufacturers and users of such nuts desire to have a bearing surface on the underside of the nut which is uninterrupted so as to give full face contact with the abutment over the whole of the surface area of the flange. Further, the nature of the flange of the nut in the prior proposal being, as it was, interrupted on three sides by the aforesaid recesses introduced difficulties in manufacture of the nut by cold forming techniques as it was found difficult in practice to ensure that metal would flow to completely fill all the confines of the die and form a perfect flange on each occasion.

The manner of detecting and checking that such nuts of the prior proposal had been correctly tightened in use was by means of a feeler gauge introduced between the surface of the abutment and the underneath of the flange of the nut in the gap along a side.

In another prior proposal a load-indicating washer has projections on one face formed by slitting and pressing out portions of the metal of the washer, such projections being intended to become almost flattened back into the plane of the washer when the desired tension has been achieved in the bolt shank.

SUMMARY OF THE INVENTION

The object of the invention is to provide an improved form of load-indicating nut or bolt which avoids the above mentioned drawbacks and enables a more accurate method of checking to be used to ensure that a nut and bolt assembly has been tightened to the desired extent.

Accordingly, for use in a nut and bolt assembly the invention provides a load-indicating nut or bolt wherein the body includes a radially outwardly extending flange, the underside of which provides a continuous, uninterrupted planar abutment-engaging surface of annular form to provide uninterrupted engagement over an annular area, with an abutment in the assembly, the part of the flange which connects with the body being inclined to the axis of the body and being constructed and arranged so that, when a predetermined tension is reached in the bolt shank during tightening of the assembly, such inclined part undergoes a plastic deformation resulting in a reduction of the overall axial dimension of the body, measured in the direction of the axis of the assembly.

The cross section of the flange, taken in a radial plane, may be such that there is provided an internal surface to the annular flange which takes the form of an annular groove of generally V-section with the apex thereof directed radially outwardly and the one leg of the V-section which is joined to the body is constructed and arranged so that when the axial tensile load in the bolt shank reaches or exceeds a predetermined minimum value, plastic deformation of the metal of the flange takes place in shear in this one leg and the body moves in a direction towards the abutment against which it is being tightened so that there occurs a measurable reduction in the overall axial dimension of the nut or bolt head.

An embodiment of the invention is hereinafter described by way of example with reference to the accompanying drawings which illustrate a form of load-indicating nut embodying the features of the invention and suitable for use in the aircraft industry.

BRIEF DESCRIPTION OF THE DRAWINGS

In the drawings:

FIG. 4 is a graph of load plotted against deformation.

DESCRIPTION OF THE PREFERRED EMBODIMENT

Figure 1:
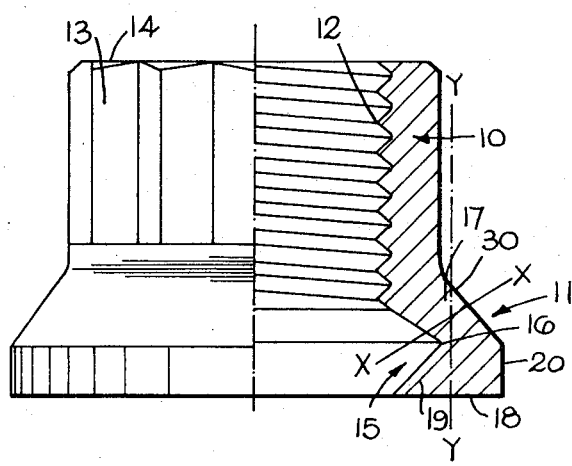
FIG. 1 is a side elevation, the right hand side being shown in cross section.
Figure 2:
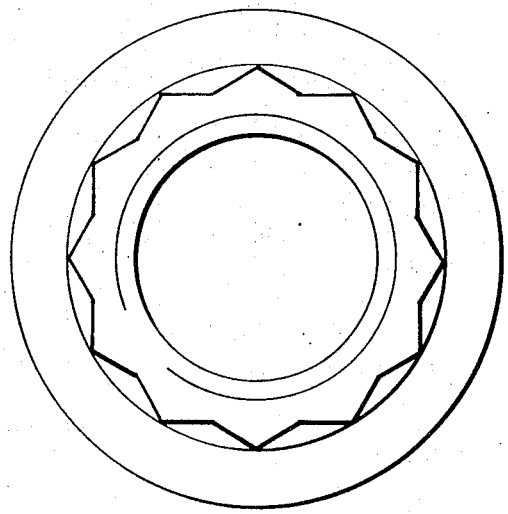
FIG. 2 is a plan view.

With reference to FIG. 1, the nut has a body, indicated at 10, and at one end thereof a radially outwardly extending flange, generally indicated at 11, the body 10 being provided in the normal way with an internal thread 12 and on its exterior with wrench-engaging surfaces 13. Any convenient form of wrench-engaging surfaces may be provided on the exterior of the body 10, the form shown in the drawing being that which is generally known as a "12 point nut".

Furthermore, where the nut is used in aircraft, the body is preferably provided in the manner indicated in the prior specification hereinbefore referred to with a further externally plain extension at its one end 14 which extension may be provided with a known form of locking or "stiff" feature such as by inwards deformation of the wall of the plain portion to produce a portion of thread at this outer end of the nut which exerts an increased frictional grip upon the threads of a mating bolt to resist any tendency for the nut to unscrew when used in applications where it is subjected to vibration.

The flange 11 is of annular form and, as seen in the right-hand side of FIG. 1, has a cross section taken in a radial plane which provides an internal surface of the flange in the form of an annular groove 15 which is of V-cross section with the apex 16 of the groove presented in the radially outwards direction. The groove V-section advisably has its apex directed radially outwardly so that the apex defines a circle with a diameter at least equal to the diameter of the body. The height of the groove as measured parallel to the axis of the body furthermore advisably is substantially equal to the height of the flange as measured parallel to the axis of the body. The one leg 17 of the flange which is connected with the body 10 is inclined to the axis of the body and the other leg 19 of the annular flange gradually increases in radially measured thickness from its join with the leg 17 until it reaches the underside of the flange where there is provided the uninterrupted annular surface 18 which is the abutment-engaging surface hereinbefore referred to. The under surface 18 is complete and uninterrupted and provides an annular under surface which can be dimensioned to provide the desired bearing surface area for the particular size of nut.

The leg 17 of the annular flange provides a portion which undergoes plastic deformation as hereinafter described and, as can be seen in FIG. 1, the thickness of this leg 17 measured radially decreases progressively from its connection with the body 10 to its connection with the other leg 19, or in other words this leg tapers in thickness. The amount of tapering is slight and has been exaggerated in the drawing in order to make it more clear. This dimensioning and arrangement of the annular flange ensures that the connection of the flange with the body 10 is the strongest part of the leg 17 of the flange and also ensures that, when under load, there is no danger of shearing taking place along the cylindrical surface indicated by the generator Y—Y, but ensures that when the predetermined minimum tension in the bolt shank is reached or exceeded the result is that the leg 17 undergoes plastic deformation in or around the general region of the conical surface indicated by the generator X—X. Further, it will be observed that the leg 19 has a radially measured thickness which increases progressively from the point where it connects with the leg 17 down to the underside surface 18 so that the leg 19 is stronger than the leg 17 and this undersurface 18 provides the complete uninterrupted annular surface which is the bearing surface for engagement with an abutment in the complete assembly of nut and bolt.

Generally, therefore, the design of the annular flange 11 is such as to provide for the plastic deformation taking place in the leg 17 but also so as to avoid any large concentration of stress at a particular point which might lead to shearing at some part of the flange. The design is also such as to minimise dilation of the body 10 when the predetermined tension is achieved and exceeded in the bolt shank. In addition to the plastic deformation which takes place in the leg 17 in the region above referred to there can be some generaly movement of the flange 11 as a whole so as to avoid concentration of stress in any particular place and there can be some actual dilation of the flange 11 which dilation may also be measured as an indication of the point at which the desired minimum tensile stress in the bolt shank has been achieved.

When the nut is tightened upon a bolt and after the surface 18 of the flange 11 has engaged with the abutment surface 18 in a nut and bolt assembly, further tightening causes increase of tension in the bolt shank and thus increase in the stresses in the whole nut and bolt assembly until the stress system in the metal of the leg 17 of the flange reaches or exceeds the elastic limit whereupon plastic deformation takes place in the region of the imaginary conical surface X—X as hereinbefore described and there occurs a reduction in the overall axial height of the nut. The stress at the aforesaid region is mainly shear but more strictly speaking it is a complicated stress system of combined shear, compression and bending.

The graph of FIG. 4 is a typical curve of axial load (tension) in the bolt shank plotted against deformation (change in height of nut) in a nut and bolt assembly.

As can be seen from this graph there occurs plastic flow of the metal in the section 17 at substantially constant load and thus if tightening is carried on until any point in the range marked by the section between the dotted lines on the graph, the amount of plastic deformation indicated thereby will ensure that the minimum tensile load required in the bolt shank has been reached and exceeded. Thus, there is a considerable amount of latitude available for the operator to ensure that he has tightened the nut down to achieve and exceed the desired tensile load.

Figure 3:
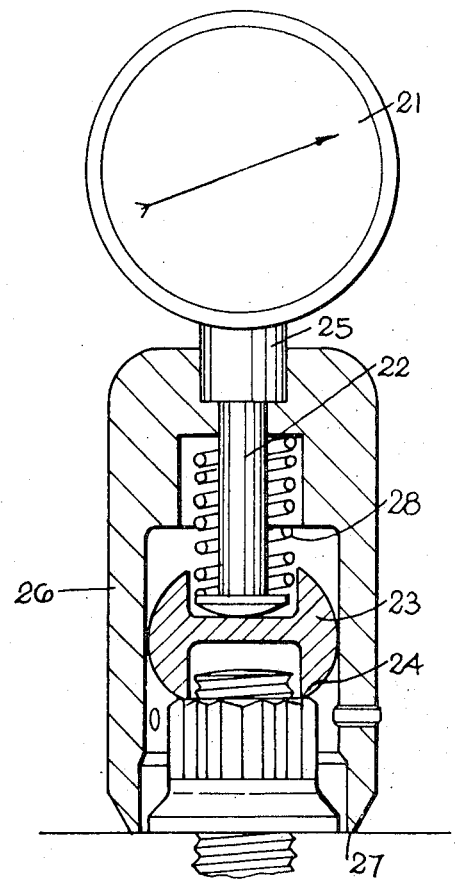
FIG. 3 is a view partly in section showing the use of a measuring gauge for determining whether a nut has been correctly tightened.

As there is also a certain relationship between applied torque and tensile load generated in the bolt shank, it is preferable, if possible, to use a known type of torque-indicating or torque-limiting wrench for tightening the nut so that the operator has a visual indication or other form of indication from the wrench that he has most probably achieved the desired tensile load, but as the relationship between torque and tensile load can be affected by other factors the final checking of the tightening nut can be done with the kind of device illustrated in FIG. 3 to ensure an accurate measurement of the reduction in overall height of the nut which is a measurement of the amount of plastic distortion which has taken place in the section 17 of the annular flange.

Instead of using a torque-indicating or torque-limiting wrench the experience of the operator may be relied upon and other techniques may be used, such as that whereby after engagement has been achieved between the surface 18 and the abutment surface of the assembly the operator gives the nut a further predetermined amount of turn which is calculated to achieve the desired amount of plastic deformation in the section 17 and which can thereafter be checked by the apparatus shown in FIG. 3.

The apparatus shown in FIG. 3 is a modification of a generally known form of gauge which has a clock-type dial 21 and a feeler stem 22, the axial extension of which is measured accurately and indicated by the needle upon the dial 21.

To adapt such form of instrument to the present application the end of the stem 22 is provided with a shoe 23 having a lower annular edge 24 which is adapted to engage upon a surface, at the upper end of the nut. Fixed to a boss 25 on the exterior of the dial 21 there is an outer cylindrical shoe 26 which extends downwardly and has a lower annular surface 27 adapted to engage against the abutment surface in the nut and bolt assembly so that the dial 21 gives an accurate measurement of the distance between the surfaces 24 and 27 of the shoes 23 and 26. A spring 28 acts upon the shoe 23 via the lower end of the stem 22 to maintain this in firm engagement with the upper face of the nut.

Thus, after the nut has been tightened down by the operator to what is thought to be the required extent the so tightened nut can be checked by an inspector using the device of FIG. 3 and an accurate indication obtained as to whether the desired amount of deformation has been obtained in the section 17, as indicated by the reduction in overall height of the nut, so as to ensure that the desired tension in the bolt shank has been reached or exceeded.

The nut as above described can be conveniently manufactured by a cold forming process to produce the nut body and the wrench-engaging surfaces and an annular flange having initially a plain cylindrical internal surface but having the frusto-conical surface 30 defining the outer face of the section 17, and the fillet which joins the flange to the body 10. The blank so produced may then be held in the chuck of a lathe or similar machine and the groove 15 cut by applying a suitable cutting tool through the opening in the lower face of the nut, the tool being applied at the correct angle to obtain the V-section groove and, during such cutting, accurate location of the nut body can be obtained by virtue of the frusto-conical surface 30 being accurately located in the chuck. This surface 30 provides a surface of reference for the accurate cutting action of the tool to provide the leg section 17 of the desired cross sectional area.

We claim:

1. For use in a nut and bolt assembly, a load indicating nut or bolt comprising a body including a flange having a single continuous uninterrupted planar abutment-engaging surface of annular form capable of engaging an abutment over an annular area, the flange having an internal annular groove of generally V-shaped cross-section taken in a radial plane, the V-section having its apex directed radially outwardly, the flange being divided by the V-shaped groove into a pair of legs, one extending from the body to the apex of the V and the other extending from the apex of the V to the abutment-engaging surface, the shape of the flange and groove being such as to define, in the first mentioned leg, a yield portion of restricted thickness inclined with respect to the axis of the body and disposed so that, when a predetermined tension is reached in the bolt shank during tightening of the assembly the yield portion undergoes plastic deformation in shear in an annular region which is defined by the rotation of an imaginary generator about the axis of the body, said generator being inclined outwardly away from said axis considered in the direction away from the abutment engaging surface, and the plastic deformation taking place in such a sense that it results in a reduction of the overall axial dimension of the body.

2. A nut or bolt according to claim 1 wherein the thickness of said one leg of the V-section flange decreases progressively from its connection with the body to the apex of the V.

3. A nut or bolt according to claim 2 wherein said other leg of the V-section flange gradually increases in thickness, measured radially, from the apex of the V-shaped groove to the abutment engaging surface of the flange.

4. For use in a bolt and nut assembly, a load indicating nut or bolt comprising a body and a flange having a single continuous uninterrupted planar abutment engaging surface of annular form capable of engaging an abutment over an annular area, the flange having an internal annular groove of generally V-shaped cross-section taken in a radial plane, the V-section having its apex directed radially outwardly and the apex defining a circle of diameter at least equal to the diameter of the body.

5. A nut or bolt according to claim 4 wherein the height of the groove as measured parallel to the axis of the body is substantially equal to the height of the flange as measured parallel to the axis of the body.

* * * * *